United States Patent [19]

Kishimoto et al.

[11] Patent Number: 5,315,710
[45] Date of Patent: May 24, 1994

[54] PROGRAM SYNTHESIZING METHOD AND APPARATUS

[75] Inventors: Yoshinori Kishimoto, Sagamihara; Koichi Yamano, Tama, both of Japan

[73] Assignee: Hitachi, Ltd., Tokyo, Japan

[21] Appl. No.: 819,869

[22] Filed: Jan. 13, 1992

[30] Foreign Application Priority Data

Jan. 25, 1991 [JP] Japan .................................. 3-007546

[51] Int. Cl.⁵ .............................................. G06F 7/32
[52] U.S. Cl. ............................ 395/700; 364/DIG. 1; 364/286; 364/222.9
[58] Field of Search .................. 395/375, 700; 364/DIG. 1

[56] References Cited

U.S. PATENT DOCUMENTS

| 4,374,408 | 2/1983 | Bowles et al. | 364/DIG. 1 |
| 5,038,296 | 8/1991 | Sano | 364/DIG. 1 |
| 5,084,813 | 1/1992 | Ono | 364/DIG. 1 |

FOREIGN PATENT DOCUMENTS 1-94431 4/1989 Japan .

*Primary Examiner*—Thomas M. Heckler
*Attorney, Agent, or Firm*—Fay, Sharpe, Beall, Fagan, Minnich & McKee

[57] ABSTRACT

A plurality of program components, which do not have matching interfaces, are combined together automatically to generate a larger new program. An interface specifications' database registers the interface specifications corresponding to each of the program components. A program transformation rule memory stores transformation rules for controlling the reconciliation of the non-matching interface specifications of the program components. A data type memory stores data type transformation rules for reconciling non matching data specifications. A mediating program generator detects a mismatch of the interface specifications between at least two program components which are being combined and generates a mediating program in accordance with the program transformation rule and the data type transformation rule which mediating program enables the two programs and their data to communicate. A components composer generates the larger new program from the program components in the program components' database and the generated mediating program.

7 Claims, 11 Drawing Sheets

(a) PROCEDURE DEFINE
  callee PROCEDURE NAME [ parameter { ( in | out | update ) DATA TYPE: ARGUMENT NAME } ]
            [ return DATA TYPE ]

(b) PROCEDURE CALL
  call PROCEDURE NAME [ parameter { ( in | out | update ) DATA TYPE } ]
            [ return DATA TYPE ]

(c) MESSAGE SEND
  send MESSAGE NAME [ parameter { DATA TYPE } ]

(d) MESSAGE RECEIVE
  receive MESSAGE NAME [ parameter { DATA TYPE } ]

FIG. 4

(a) TRANSFORMATION FROM PROCEDURE CALL TO MESSAGE COMMUNICATIONS

```
call PROCEDURE NAME [ parameter {( in DATA TYPE pi | out DATA TYPE po
                                 | update DATA TYPE pu )}]
           [ return DATA TYPE r]
→callee PROCEDURE NAME [ parameter {( in DATA TYPE pi: ARGUMENT NAME i
                                    | out DATA TYPE po: ARGUMENT NAME o
                                    | update DATA TYPE pu: ARGUMENT NAME u)}]
         [ return DATA TYPE r ]
   send MESSAGE NAME s [ parameter {( DATA TYPE po | DATA TYPE pu )}]
   receive MESSAGE NAME r [ parameter [ DATA TYPE r ]{( DATA TYPE pi | DATA TYPE pu )}]
```

(b) TRANSFORMATION FROM MESSAGE COMMUNICATIONS TO PROCEDURE CALL

```
send MESSAGE NAME s [ parameter { DATA TYPE ps }]
receive MESSAGE NAME r [ parameter [ DATA TYPE r ] ( DATA TYPE pr )]
   receive MESSAGE NAME s [ parameter ( DATA TYPE ps )]
   call PROCEDURE NAME [ parameter {( in DATA TYPE pr | out DATA TYPE ps )}]
           [ return DATA TYPE r]
   send MESSAGE NAME r [ parameter [ DATA TYPE r] { DATA TYPE pr }]
```

(c) TRANSFORMATION FROM PROCEDURE DEFINE TO MESSAGE COMMUNICATIONS

```
callee PROCEDURE NAME [ parameter {( in DATA TYPE pi: ARGUMENT NAME i
                                  | out DATA TYPE po: ARGUMENT NAME o
                                  | update DATA TYPE pu: ARGUMENT NAME u)}]
          [ return DATA TYPE r]

receive MESSAGE NAME r [ parameter {( DATA TYPE pi | DATA TYPE pu )}]
   call PROCEDURE NAME [ parameter {( in DATA TYPE pi | out DATA TYPE po
                                    | update DATA TYPE pu )}]
          [ return DATA TYPE r]
   send MESSAGE NAME s [ parameter [DATA TYPE r] {( DATA TYPE po | DATA TYPE pu )}]
```

(d) TRANSFORMATION FROM MESSAGE COMMUNICATIONS TO PROCEDURE DEFINE

```
receive MESSAGE NAME r [ parameter { DATA TYPE pr }]
send MESSAGE NAME    s [ parameter [ DATA TYPE r ] { DATA TYPE ps }]
   callee PROCEDURE NAME [ parameter {( in DATA TYPE pi: ARGUMENT NAME i
                                     | out DATA TYPE po:ARGUMENT NAME o
                                     | update DATA TYPE pu: ARGUMENT NAME u)}]
          [ return DATA TYPE r]
   send MESSAGE NAME r [ parameter {(DATA TYPE po | DATA TYPE pu )}]
   receive MESSAGE NAME s [ parameter [ DATA TYPE r ]{( DATA TYPE pi | DATA TYPE pu )}]
```

FIG.5

51 ··· PROGRAM COMPONENT
52 ··· MEDIATING PROGRAM

FIG. 6

MONTH-DAY-YEAR ⊆ YEAR-DAY
MONTH-DAY-YEAR ≡ YEAR-DAY.YEAR
if isleap (YEAR-DAY.YEAR)

| | | |
|---|---|---|
| if | YEAR-DAY.DAY >335 | MONTH-DAY-YEAR.MONTH ≡12, MONTH-DAY-YEAR-DAY ≡ YEAR-DAY.DAY -335 |
| else if | YEAR-DAY.DAY >305 | MONTH-DAY-YEAR.MONTH ≡11, MONTH-DAY-YEAR.DAY ≡ YEAR-DAY.DAY -305 |
| else if | YEAR-DAY.DAY >274 | MONTH-DAY-YEAR.MONTH ≡10, MONTH-DAY-YEAR.DAY ≡ YEAR-DAY.DAY -274 |
| else if | YEAR-DAY.DAY >244 | MONTH-DAY-YEAR.MONTH ≡ 9, MONTH-DAY-YEAR.DAY ≡ YEAR-DAY.DAY -244 |
| else if | YEAR-DAY.DAY >213 | MONTH-DAY-YEAR.MONTH ≡ 8, MONTH-DAY-YEAR.DAY ≡ YEAR-DAY.DAY -213 |
| else if | YEAR-DAY.DAY >182 | MONTH-DAY-YEAR.MONTH ≡ 7, MONTH-DAY-YEAR.DAY ≡ YEAR-DAY.DAY -182 |
| else if | YEAR-DAY.DAY >152 | MONTH-DAY-YEAR.MONTH ≡ 6, MONTH-DAY-YEAR.DAY ≡ YEAR-DAY.DAY -152 |
| else if | YEAR-DAY.DAY >121 | MONTH-DAY-YEAR.MONTH ≡ 5, MONTH-DAY-YEAR.DAY ≡ YEAR-DAY.DAY -121 |
| else if | YEAR-DAY.DAY > 91 | MONTH-DAY-YEAR.MONTH ≡ 4, MONTH-DAY-YEAR.DAY ≡ YEAR-DAY.DAY - 91 |
| else if | YEAR-DAY.DAY > 60 | MONTH-DAY-YEAR.MONTH ≡ 3, MONTH-DAY-YEAR.DAY ≡ YEAR-DAY.DAY - 60 |
| else if | YEAR-DAY.DAY > 31 | MONTH-DAY-YEAR.MONTH ≡ 2, MONTH-DAY-YEAR.DAY ≡ YEAR-DAY.DAY - 31 |
| else | | MONTH-DAY-YEAR.MONTH ≡ 1, MONTH-DAY-YEAR.DAY ≡ YEAR-DAY.DAY | else

| | | |
|---|---|---|
| if | YEAR-DAY.DAY >334 | MONTH-DAY-YEAR.MONTH ≡12, MONTH-DAY-YEAR-DAY ≡ YEAR-DAY.DAY -334 |
| else if | YEAR-DAY.DAY >304 | MONTH-DAY-YEAR.MONTH ≡11, MONTH-DAY-YEAR.DAY ≡ YEAR-DAY.DAY -304 |
| else if | YEAR-DAY.DAY >273 | MONTH-DAY-YEAR.MONTH ≡10, MONTH-DAY-YEAR.DAY ≡ YEAR-DAY.DAY -273 |
| else if | YEAR-DAY.DAY >243 | MONTH-DAY-YEAR.MONTH ≡ 9, MONTH-DAY-YEAR.DAY ≡ YEAR-DAY.DAY -243 |
| else if | YEAR-DAY.DAY >212 | MONTH-DAY-YEAR.MONTH ≡ 8, MONTH-DAY-YEAR.DAY ≡ YEAR-DAY.DAY -212 |
| else if | YEAR-DAY.DAY >181 | MONTH-DAY-YEAR.MONTH ≡ 7, MONTH-DAY-YEAR.DAY ≡ YEAR-DAY.DAY -181 |
| else if | YEAR-DAY.DAY >151 | MONTH-DAY-YEAR.MONTH ≡ 6, MONTH-DAY-YEAR.DAY ≡ YEAR-DAY.DAY -151 |
| else if | YEAR-DAY.DAY >120 | MONTH-DAY-YEAR.MONTH ≡ 5, MONTH-DAY-YEAR.DAY ≡ YEAR-DAY.DAY -120 |
| else if | YEAR-DAY.DAY > 90 | MONTH-DAY-YEAR.MONTH ≡ 4, MONTH-DAY-YEAR.DAY ≡ YEAR-DAY.DAY - 90 |
| else if | YEAR-DAY.DAY > 59 | MONTH-DAY-YEAR.MONTH ≡ 3, MONTH-DAY-YEAR.DAY ≡ YEAR-DAY.DAY - 59 |
| else if | YEAR-DAY.DAY > 31 | MONTH-DAY-YEAR.MONTH ≡ 2, MONTH-DAY-YEAR.DAY ≡ YEAR-DAY.DAY - 31 |
| else | | MONTH-DAY-YEAR.MONTH ≡ 1, MONTH-DAY-YEAR.DAY ≡ YEAR-DAY.DAY | where isleap (y) ≡ if ((y mod 4) = 0 and (y mod 100) ≠ 0)  true
    or (y mod 400) = 0
else  false;

FIG.7

YEAR-DAY ⊆ MONTH-DAY-YEAR
YEAR-DAY.YEAR ≡ MONTH-DAY-YEAR.YEAR ;
case MONTH-DAY-YEAR.MONTH of
    1: YEAR-DAY.DAY ≡ MONTH-DAY-YEAR.DAY ;
    2: YEAR-DAY.DAY ≡ MONTH-DAY-YEAR.DAY +31 ;
    3: YEAR-DAY.DAY ≡ MONTH-DAY-YEAR.DAY +59 ;
    4: YEAR-DAY.DAY ≡ MONTH-DAY-YEAR.DAY +90 ;
    5: YEAR-DAY.DAY ≡ MONTH-DAY-YEAR.DAY +120 ;
    6: YEAR-DAY.DAY ≡ MONTH-DAY-YEAR.DAY +151 ;
    7: YEAR-DAY.DAY ≡ MONTH-DAY-YEAR.DAY +181 ;
    8: YEAR-DAY.DAY ≡ MONTH-DAY-YEAR.DAY +212 ;
    9: YEAR-DAY.DAY ≡ MONTH-DAY-YEAR.DAY +243 ;
    10: YEAR-DAY.DAY ≡ MONTH-DAY-YEAR.DAY +273 ;
    11: YEAR-DAY.DAY ≡ MONTH-DAY-YEAR.DAY +304 ;
    12: YEAR-DAY.DAY ≡ MONTH-DAY-YEAR.DAY +334 ;
  end;
if isleap (MONTH-DAY-YEAR.YEAR ) & MONTH-DAY-YEAR.MONTH >2
                                    YEAR-DAY.DAY≡ YEAR-DAY.DAY+1;
where
    isleap(y) ≡ if ((y mod 4) = 0 and (y mod 100)≠0)
              or (y mod 4) = 0              true
        else                                false;

(a) call date return     YEAR-DAY (b) receive current_data
    send    today parameter  MONTH-DAY-YEAR (c) callee date return   YEAR-DAY
    send   current_data
    receive today parameter   YEAR-DAY (d) receive current_data
    send    today parameter   YEAR-DAY

PROGRAM SYNTHESIZING METHOD AND APPARATUS

BACKGROUND OF THE INVENTION

(1) Field of the Invention

The present invention relates to a program composing or synthesizing, method and apparatus for composing a program by connecting a plurality of program components, and more particularly to a program composing method and apparatus for composing a program from a plurality of program components having different interfaces.

(2) Description of the Related Art

Figure 2:
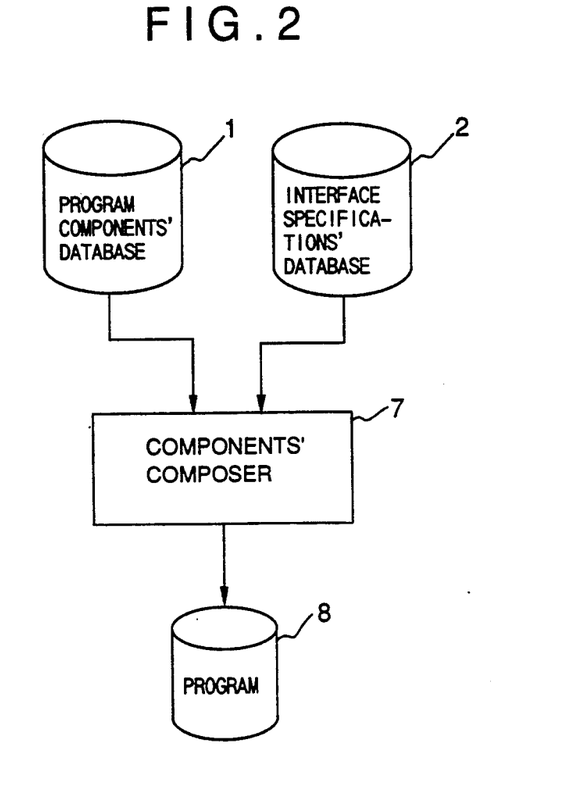
FIG. 2 is a diagram showing the structure of a conventional program components composing apparatus.

An apparatus for composing a program by connecting a plurality of program components is known. As shown in FIG. 2, this apparatus is provided with a program components' database 1 for storing program components and an interface specifications' database 2 for storing component specification information (hereinafter called interface specification information) corresponding to rules of how program components are used. A plurality of program components are selected from the program components' database, and corresponding interface specifications are selected from the interface specifications' database in accordance with the rules stored in the header fields of the selected program components, to thereby compose a new program 8.

Such a program components composing apparatus is described, for example, in JP-A-1-94431.

SUMMARY OF THE INVENTION

Such a conventional apparatus cannot compose a program unless the interfaces of program components have a perfect match or integrity therebetween. Without a perfect match, a user is required to manually modify program components so as to obtain a match between interfaces and then register the modified program components and interface specifications.

A "perfect match" between interfaces means that (a) program components' connection mechanisms, such as "procedure call" and "message communications" for transfer of control codes and data between program components are the same, (b) target "procedure names" in "procedure call" are the same, or target "message text names (target names)" in "message communications" are the same, and (c) the numbers and orders of "procedure arguments" used in "procedure call" are the same, or the numbers and orders of "message parameters" used in "message communications" are the same.

A work of modifying program components to obtain an interface match imposes a large burden on programmers (users)..

It is an object of the present invention to provide a program composing or synthesizing apparatus and method capable of composing program components even if there is a mismatch between the interfaces of the plurality of selected program components.

In order to achieve the above object, a program composing apparatus of the present invention comprises a first storage unit for storing a transformation rule for a part (connection mechanism of interface) of each program component for transfer of control codes and data, a second storage unit for storing a transformation rule for a parameter data type, means responsive to a mismatch between the interfaces of program components to be composed, for obtaining a match between the interface specifications of the program components while referring to the first and second storage units, and generating a mediating program which transforms a mismatched interface into a matched interface, and means for composing the mediating program and a plurality of program components.

According to a preferred embodiment of the present invention, the program components composing apparatus comprises a storage unit for storing a program components' database 1 which registers therein a plurality of program components, a storage unit for storing an interface specifications' database 2 which registers therein the interface specifications of the program components, a storage unit for storing a transformation rule 3 for a connection mechanism part of each interface, a storage unit for storing a transformation rule 4 for a data type in each interface, a mediating program generator 5 for generating a mediating program 6 which obtains a match between interface specifications in accordance with the connection mechanism transformation rule and data type transformation rule, and a components' composer 7 for composing a new program from program components registered in the program components' database and the generated mediating program.

With the above arrangement of the present invention, even if the interfaces of program components to be composed are mismatched to each other, they are made matched using a connection mechanism transformation rule and data type transformation rule, and a desired composed program can be obtained without manually modifying program components.

The foregoing and other objects, advantages, manner of operation and novel features of the present invention will be understood from the following detailed description when read in connection with the accompanying drawings.

BRIEF DESCRIPTION OF THE DRAWINGS

FIG. 4, consisting of FIGS. 4(a) to 4(d), shows examples of mechanism transformation rules;

FIG. 6 shows an example of a data transformation rule;

DESCRIPTION OF THE PREFERRED EMBODIMENTS

Embodiments of the present invention will be described with reference to the accompanying drawings.

Figure 1:
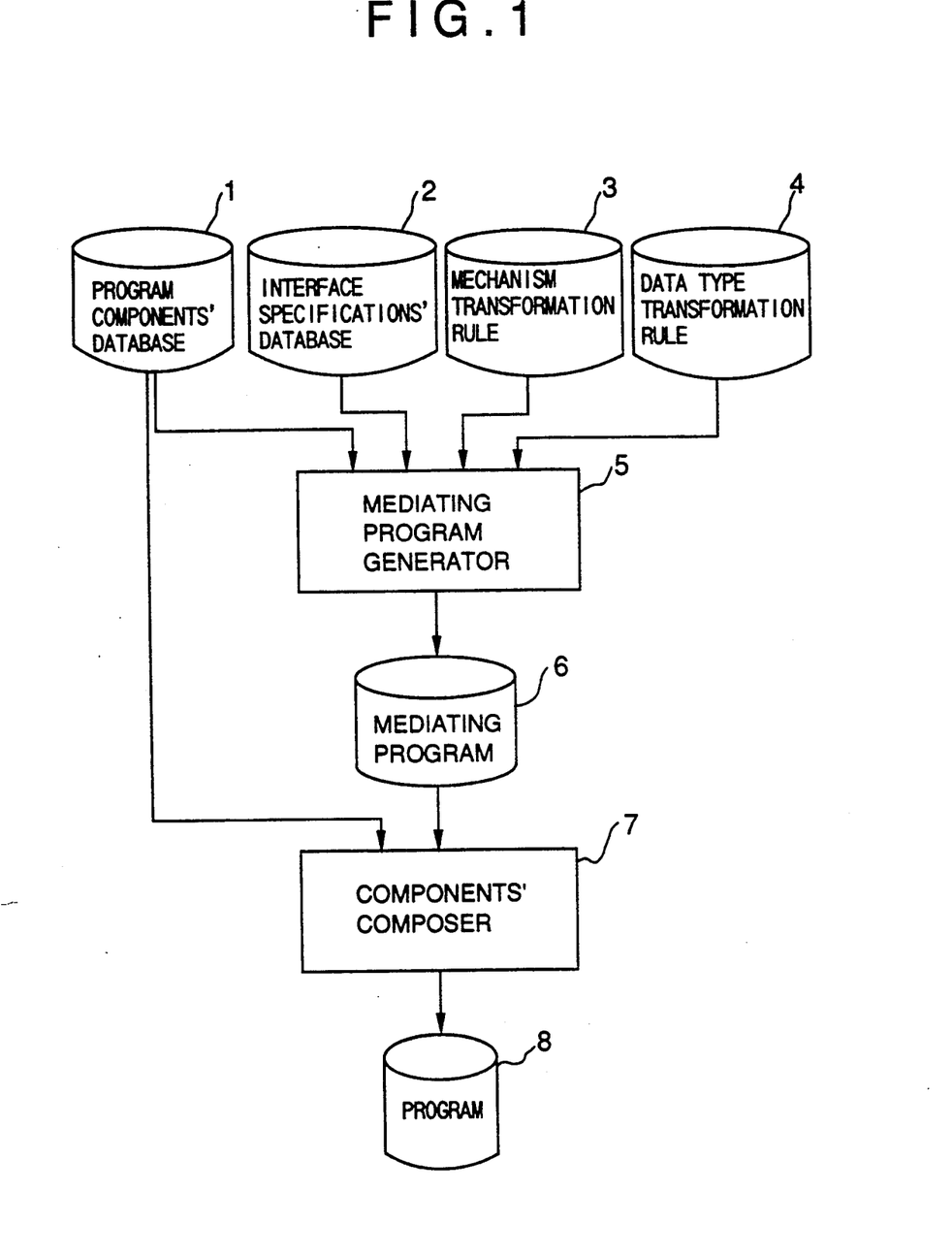
FIG. 1 is a diagram showing the structure of a program components composing apparatus embodying the present invention.

FIG. 1 shows the structure of an embodiment of the present invention. Reference numeral 1 represents a program components' database for storing a plurality of program components to be composed. Numeral 2 represents an interface specifications' database for storing interface specifications of respective program components stored in the program components' database. Numeral 3 represents mechanism transformation rules for interfaces which rules are used for transformation between a plurality of types of connection mechanisms of program components, such as "procedure call" and "message communications". Numeral 4 represents data type transformation rules for interface parameters which rules are used, when composing program components, in judging whether data types can be transformed. Numeral 5 represents a mediating program generator for mediating program components. The mediating program generator 5 checks a match between interface specifications, supplied from the interface specifications' database 2, of program components to be composed. If there is a mismatch between the program specifications, the interfaces are modified so as to obtain a match, using a mediating program 6 for transforming mismatched interfaces into matched interfaces, in accordance with the mechanism transformation rule 3 and data type transformation rule 4. Numeral 7 represents a components' composer which generates a program 8 by composing a plurality of program components supplied from the program components' database 1, by using the generated mediating program 6.

Figure 3:
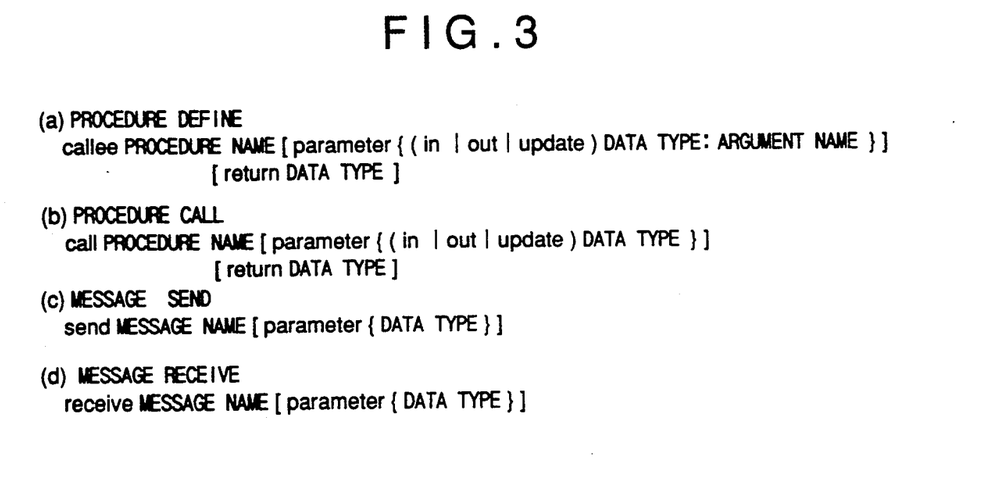
FIG. 3, consisting of FIGS. 3(a) to 3(d), shows examples of syntactic rules of interface specifications of program components.

FIG. 3 shows examples of syntactic rules of interface specifications of program components. In FIG. 3, parameters and the like in [...] can be omitted, parameters and the like in {...} can be repeated, and parameters and the like in (... |...) are selectively used. For example, parameters A and B in (A|B) are selectively used.

"in", "out", and "update" indicate how an argument is used, namely, "in" means an argument is used only for input, "out" means an argument is used only for output, and "update" means an argument is used both for input and output. The interface specifications of program components stored in the interface specifications' database 2 are described using such syntactic rules.

FIGS. 4(a) to 4(d) show examples of mechanism transformation rules 3. FIGS. 5(a) to 5(d) are supplemental diagrams illustrating the mechanism transformation rules. A mechanism transformation rule is a rule for generating a mediating program 6 from the syntactic rules of interface specifications of a plurality of program components to be composed.

Figure 5:
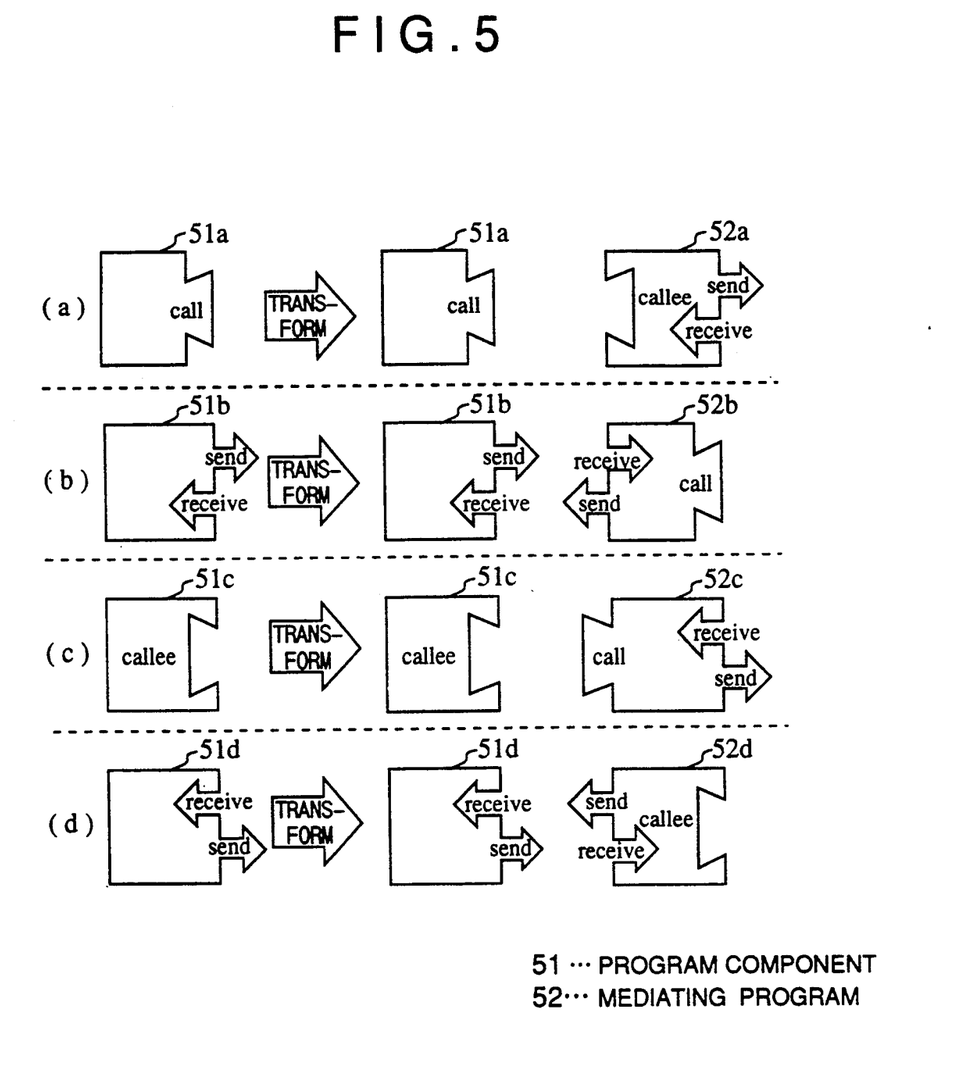
FIG. 5, consisting of FIGS. 5(a) to 5(d) shows supplemental diagrams illustrating the mechanism transformation rules.

FIG. 4(a) shows a mediating program to be generated for the case in which one program component to be composed has an interface specification of "procedure call" and the other program component to be composed has an interface specification of "message communications". This mediating program defines a virtual procedure "callee" for receiving "procedure call", within this procedure "callee", a message is sent and received. The parameters of "message send" include an output only argument and an input/output argument, and the parameters of "message receive" include a return value, an input only argument, and an input/output argument. In the above manner, as shown in FIG. 5(a), there is generated a mediating program 52a for transforming "procedure call" into "message send/receive" respectively of the interface specifications of program components 51a, while referring to the mechanism transformation rule 3 shown in FIG. 4(a) and the interface specifications of the program components.

FIG. 4(b) shows a mediating program to be generated for the case in which one program component to be composed has an interface specification of "message communications" and the other program component to be composed has an interface specification of "procedure call". This mediating program receives a transmitted message with a "message name s", executes "procedure call", and sends the results as a message with a "message name r". In the above manner, as shown in FIG. 5(b), there is generated a mediating program 52b for transforming "message communications" into "procedure call" respectively of the interface specifications of program components 51b, while referring to the mechanism transformation rule 3 shown in FIG. 4(b) and the interface specifications of the program components.

FIG. 4(c) shows a mediating program to be generated for the case in which one program component to be composed has an interface specification of "procedure define" and the other program component to be composed has an interface specification of "message communications". This mediating program receives a transmitted message with a "message name r", executes "procedure call", and sends the results of a message with a "message name s". In the above manner, as shown in FIG. 5(c), there is generated a mediating program 52c for transforming "procedure define" into "message communications" respectively of the interface specifications of program components 51c, while referring to the mechanism transformation rule 3 shown in FIG. 4(c) and the interface specifications of the program components.

FIG. 4(d) shows a mediating program to be generated for the case in which one program component to be composed has an interface specification of "message communications" and the other program component to be composed has an interface specification of "procedure define". This mediating program defines a virtual procedure "callee" for receiving "procedure call". Within this virtual procedure "callee", a message with a "message name r" is sent and a message with a "message name s" is received. In the above manner, as shown in FIG. 5(d), there is generated a mediating program 52d for transforming "message communications" into "procedure define" respectively of the interface specifications of program components 51d, while referring to the mechanism transformation rule 3 shown in FIG. 4(d) and the interface specifications of the program components.

Figure 7:
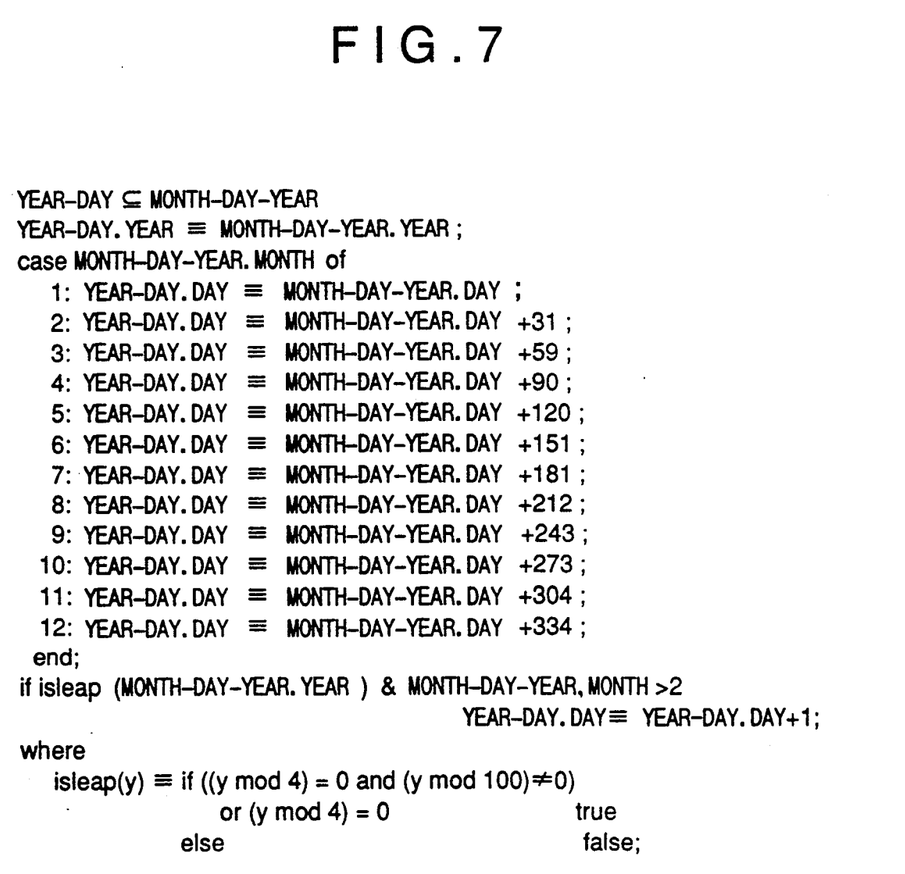
FIG. 7 shows another example of the data transformation rule.

FIGS. 6 and 7 show examples of data type transformation rules. The data type transformation rules defined as shown in FIGS. 6 and 7 are rules applied between two data types "month-day-year" and "year-day". In the data type "month-day-year", "month-dayyear.month" represents each month: January, February ... December, and "month-day-year.day" represents a data. In the data type "year-day", "year-day.day" represents the total number of days as counted from January 1. For example, if "year-day.day" is 35, then it stands for February 4 which in the data type "month-day-year" becomes "month-day-year.month"=2 and "month-day-year.day"=4.

The first row of FIG. 6 indicates that "year-day" can be transformed into "month-day-year", and the second and following rows shown the transformation procedure. The transformation rule shown in FIG. 7 defines transformation from "month-day-year" to "year-day".

The mediating program generator 5 checks a match between the interface specifications of program components to be composed. If there is a mismatch, the mediating program generator 5 transforms mismatched interface specifications into matched interface specifications, using the mechanism transformation rules 3 and data type transformation rules 4. During this transformation procedure, the interface specifications held by the mediating program generator are called "present specifications". The procedure of interface matching will be described with reference to the flow chart of FIG. 8. A plurality of program components may sometimes be composed, and each program component may sometimes have a plurality of interfaces. In such a case, pairs of the interfaces are sequentially processed to be matched. For the simplicity of description, in the following embodiments, the interface matching procedure between two interfaces of two program components will be described. One of a pair of two interfaces should serve as a receptor of action from the other interface. For example, an interface of "procedure define" or "message receive" is a receptor of its counterpart "procedure call" or "message send". In the following, the interface serving as a receptor is called "passive interface", and its counterpart interface is called "active interface". The interface specifications of a passive interface and an active interface are called "passive specification" and "active specification", respectively.

Figure 8:
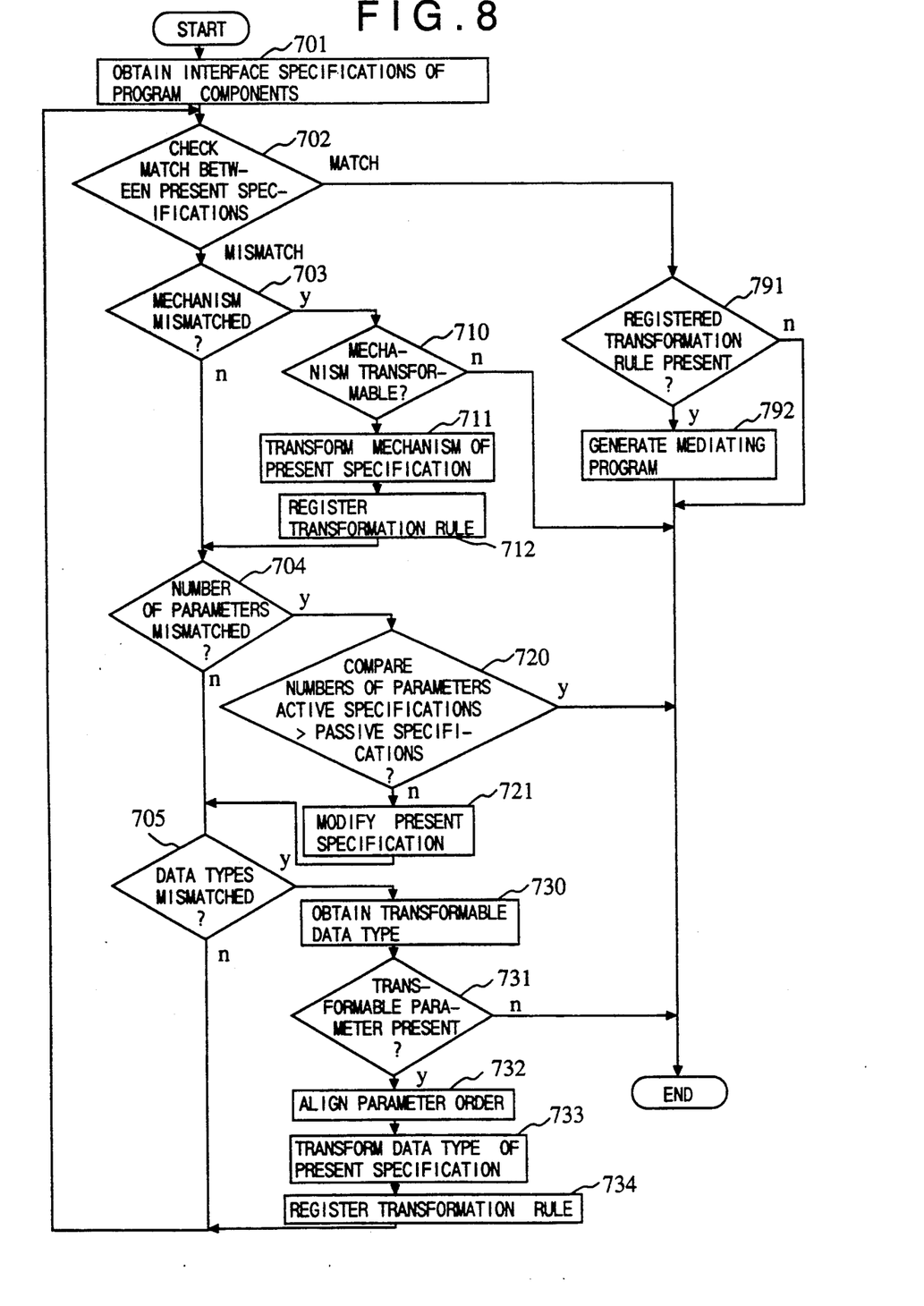
FIG. 8 is a flow chart showing the procedure to be executed by a mediating program generator.

FIG. 8 is a flow chart illustrating the procedure to be executed by the mediating program generator. First at step 701 the interface specifications of program components to be composed are derived from the interface specifications' database 2. The derived specifications are present specifications at the initial stage. At step 702 it is checked whether the present specifications are matched to each other. If matched, it is checked at step 791 whether there exist the transformation rules used for the matching. If exist, a mediating program is generated at step 792 and thereafter the procedure is terminated.

If the present specifications are not matched, it is checked at step 703 whether the mismatch is a mechanism mismatch. If mechanism mismatch, the mechanism transformation rules 3 are checked at step 710. If the mechanism can be transformed, the present specification is transformed at step 711, and the transformation rule used is registered at step 712 while giving a correspondence to the associated interface specification. Thereafter, the procedure advances to step 704. If the mechanism cannot be transformed, it is judged that matching is impossible, to thereafter terminate the procedure.

If the mismatch is not a mechanism mismatch at step 703, it is checked at step 704 if the numbers of parameters are mismatched. If mismatched, the number of parameters of the passive specification of the present specification is compared with the number of parameters of the active specification of the present specification. If the number of parameters of the active specification is greater than that of the passive specification, the present specification is modified at step 721 so as to make the number of parameters of the active specification match that of the passive specification. If the number of parameters of the active specification is less than that of the passive specification, it is judged that matching is impossible, to thereafter terminate the procedure.

If the numbers of parameters are not mismatched at step 2-4, it is then checked at step 705 whether the data types are mismatched. In the case of a data type mismatch, data types transformable into those of the present specification are obtained first at step 730 while referring to the data type transformation rules 4. It is checked next at step 731 whether there are data types of parameters of the active specification transformable into the data types of the passive specification. If there are transformable data types, the order of parameters of the active specification are arranged at step 732 to have the same parameter order of the passive specification. The data types of the present specification are transformed at step 733. The transformation rule used is registered at step 734 while giving a correspondence to the associated interface specification, and thereafter the procedure returns to step 702. If the data type cannot be transformed, it is judged that matching is impossible, to terminate the procedure.

Figure 9:
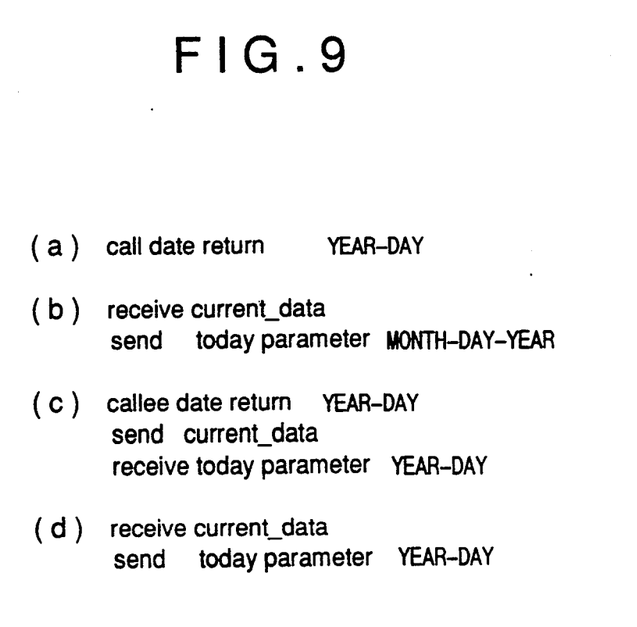
FIG. 9, consisting of FIGS. 9(a) to 9(d), shows an example of transformation of interface specifications to obtain a match therebetween.

FIG. 9 shows an example of transformation of interface specifications to obtain a match therebetween. FIGS. 9(a) and 9(b) show the interface specifications of two program components. FIGS. 9(a) shows an active interface specification for calling a procedure "date" without using an argument, and receiving as a return value a "year-date" type data. FIG. 9(b) shows a passive interface specification for receiving a message "current-date" without parameter, and sending a message "today" with a "month-day-year" type parameter. The matching procedure for the interface specifications of FIGS. 9(a) and 9(b) will be described with reference to FIG. 8 by using the mechanism transformation rule of FIG. 4(a) and the data type transformation rules of FIGS. 6 and 7. The interface specifications derived at step 701 are the specifications shown in FIGS. 9(a) and 9(b). These specifications are mismatched to each other (step 702), and the mechanisms are mismatched to each other (step 703) so that the mechanism transformation rules are checked at step 710. Since the transformation rule shown in FIG. 4(a) can be used, the specification shown in FIG. 9(a) is transformed in a specification of FIG. 9(c). The rule of FIG. 4(a) is registered at step 712. Next, at step 704 the numbers of parameters of the present specifications shown in FIG. 9(b) and 9(c) are checked. In this case, the numbers of parameters are the same so that the procedure advances to step 705. The data types of parameters are mismatched between the data type "month-day-year" of the send message of FIG. 9(b) and the data type "year-day" of the receive message of FIG. 9(c). At step 730 transformable data types are obtained from the data type transformation rules shown in FIGS. 6 and 7. It can be known therefore that the data type "month-day-year" can be transformed into the data type "year-day" and, the data type "year-day" into the data type "month-day-year". Next at step 732 the order of parameters of the active specification is rearranged to have the same order of the passive specification. In this case, there is only one parameter so that the parameter order does not change. Next, at step 733, the data type "month-day-year" is transformed into the data type "year-day". As a result, the specification of FIG. 9(b) is transformed into a specification of FIG. 9(d). At step 734, the transformation rule of FIG. 7 used at that time is registered. Next, the procedure returns to step 702. In this case, the present interface specifications shown in FIGS. 9(c) and 9(d) are matched to each other so that the procedure advances to step 791. Since the rules shown in FIG. 4(a) and FIG. 7 have been registered, a mediating program is generated at step 792, to thereafter terminate the procedure.

Figure 10:
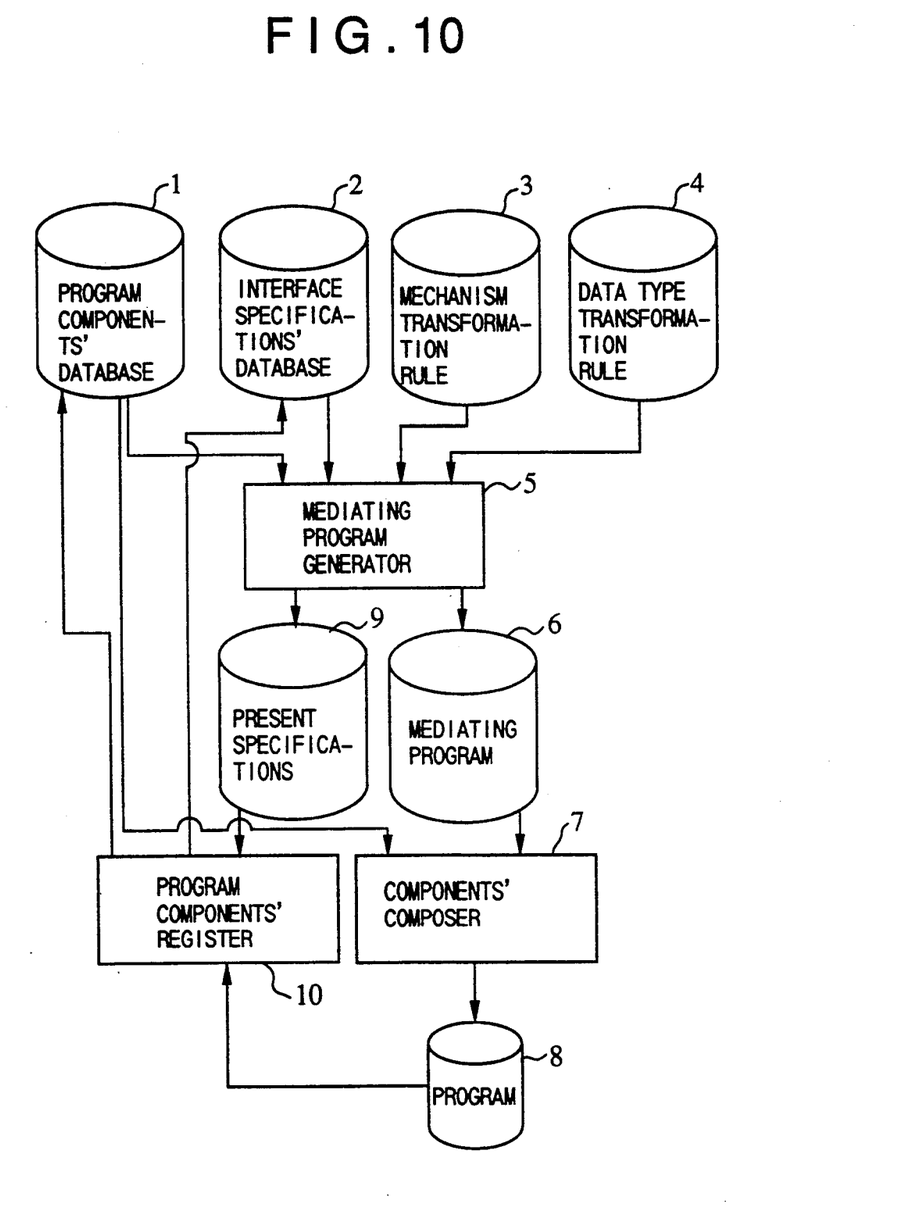
FIG. 10 is a diagram showing the structure of a program components composing apparatus which allows to use a composed program as a new program component.
Figure 11:
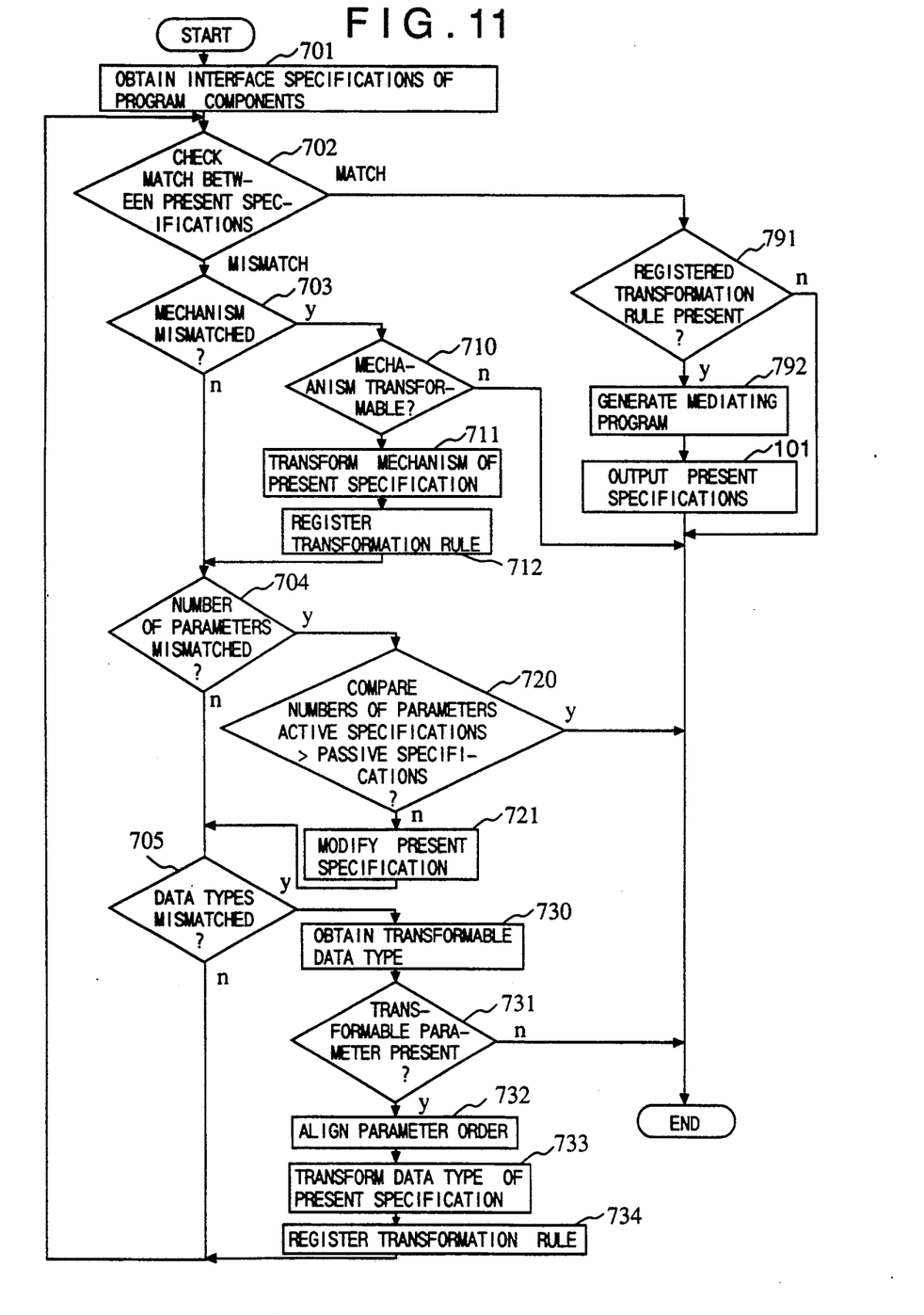
FIG. 11 is a flow chart showing the procedure to be executed by a mediating program generator of the program components composing apparatus which allows to use a composed program as a new program component.
Figure 12:
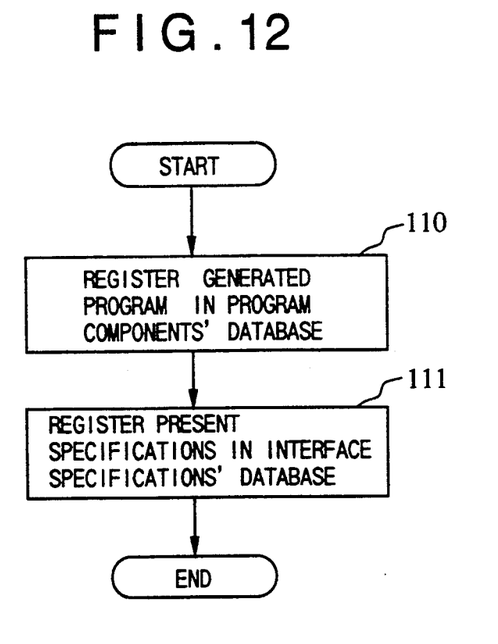
FIG. 12 is a flow chart showing the procedure to be executed by a program component register of the program components composing apparatus which allows to use a composed program as a new program component.

In the above-described embodiment, a program is generated from program components already stored in the program components' database 1 and interface specifications' database 2. As an alternative, a generated program may be newly registered in the program components' database 1 and interface specifications' database 2 to reuse it as a new program component. The structure of a program composing apparatus realizing such a function is shown in FIG. 10. In FIG. 10 a mediating program generator 5 outputs a mediating program 6 as well as a matched present specification 9. A program component register 10 registers a program 8 generated by a components' composer 7, and outputs it as a new program component into the program components' database 1. The present specification is registered as an interface specification of the new program component in the interface specifications' database 2. The procedure to be executed by the mediating program generator is shown in FIG. 11. In FIG. 11, the processes from step 701 to step 792 are the same as described with FIG. 8. After step 792, the matched present specification is outputted at step 101. FIG. 12 is a flow chart showing the procedure to be executed by the program component register 10. At step 110 a program 8 generated by the components' composer 7 is registered as a new program component in the program components' database 1, and at step 111 a present specification 9 outputted from the mediating program generator 5 is registered as the interface specification of the new program component in the interface specifications' database 2.

According to the present invention, a program can be composed from program components even if they have mismatched interfaces, without manually changing the program components, by generating an interface mediating program using a mechanism transformation rule and data type transformation rule. Furthermore, by registering a generated program as a new program component, it is possible to increase the number of program components and improve a reuse of program components.

What is claimed is:

1. A program generating apparatus for generating a new program from at least first and second program components, the first and second program components having non-matching interface specifications, each interface specification including a program connection mechanism by which the corresponding program component interacts with other program components and a data type which the corresponding program component processes, the program generating apparatus comprising:
   a program components' database means for storing said program components;
   an interface specifications' database means for storing the interface specifications of said program components;
   means for storing a connection mechanism transformation rule for controlling transforming the connection mechanisms of the first and second program components to be compatible with each other;
   means for storing a data type transformation rule for controlling transforming the data type of the first program component into the data type of the second program component and the data type of the second program component into the data type of the first program component;
   a mediating program generator for detecting that the interface specifications of the first and second program components are non-matching and without modifying the first and second program components generating a mediating program which has said connection mechanisms of the interface specifications of the first and second programs for interconnection with both the first and second program components and which (i) transforms said data types of the first program component into the data type of the second program component and the data type of the second program component into the data type of the first program component and (ii) transforms connection mechanisms of the first and second program components to be compatible with each other in accordance with said connection mechanism transformation rule and said data type transformation rule; and,
   a components' composer means for generating the new program by combining said first and second program component and said mediating program, the new program being stored in the program components' database means.

2. A program generating apparatus according to claim 1, wherein said new program generated by said components' composer means is stored as a new program component into said program components' database means, and a corresponding interface specification generated for said new program is stored in the interface specification database means.

3. A program synthesizing apparatus for generating a new program by synthesizing a plurality of program components, each program component having a different interface specification defining a connection mechanism part and a data type, the apparatus comprising:
   a program components' database means for storing the plurality of program components;
   an interface specifications' database means for storing the interface specifications of said program components;
   means for storing a connection mechanism transformation rule for transforming the connection mechanism part defined in each said interface specification into another connection mechanism part;
   a mediating program generator for detecting a difference between interface specifications of at least two program components and generating a mediating program for transforming said connection mechanism part defined in each said interface specification into the another connection mechanism part, at least in accordance with said connection mechanism transformation rule; and
   a components' composer for generating the new program by synthesizing said program component stored in said program components' database means and said mediating program.

4. A program synthesizing apparatus according to claim 3, wherein said new program generated by said components' composer is stored as a new program component in said program components' database means, and said corresponding interface specification generated by said new program is stored as a new interface specification of said new program component in said interface specifications' database means.

5. A program synthesizing apparatus for generating a new program from a plurality of program components, each of the plurality of program components having a different interface specification, each interface specification including a program connection mechanism part and a data type, the apparatus comprising:
 a program components' database means for storing said plurality of program components;
 an interface specifications' database means for storing the interface specifications of said plurality of program components;
 means for storing connection mechanism transformation rules for transforming the connection mechanism part of a first selected one of the program components and the connection mechanism part of a second selected one of the programs components into each other;
 means for storing a data type transformation rule for transforming the data type of said interface specification of the first and second program components into the data type of said interface specification of the second and first program components, respectively;
 a mediating program generator for detecting a difference between interface specifications of the first and second selected program components and generating a mediating program for transforming said connection mechanism part and said data type defined in the interface specifications of the first and second selected program components into the connection mechanism part and the data type of the each other, in accordance with said connection mechanism transformation rule and said data type transformation rule; and,
 a components' composer for generating the new program by synthesizing said first and second selected program components and said generated mediating program.

6. A program synthesizing method for generating a new program by synthesizing at least two desired program components each having a different interface specification defining a connection mechanism part, by using a processing apparatus connected with a storage device, the method comprising:
 selecting the at least two desired program components from a database which holds a plurality of program components for selection;
 checking for a difference between the interface specifications of said selected at least two desired program components;
 responsive to detecting the difference between the interface specifications of said selected program components, checking among a plurality of connection mechanism transformation rules for a connection mechanism transformation rule which provides coincidence between connection mechanism parts of the interface specifications of the at least two desired program components;
 responsive to a presence of said connection mechanism transformation rule which provides coincidence between the interface specifications of the at least two desired program components, storing said connection mechanism transformation rule in said storage device;
 generating a mediating program for synthesizing said at least two desired program components with said stored connection mechanism transformation rule; and
 generating the new program by synthesizing said mediating program and said at least two desired program components.

7. A program synthesizing method according to claim 6, wherein each interface specification further defines a data type and further comprising:
 checking for a difference between the data types of the interface specifications of at least said two desired program components; and
 responsive to the difference between the data types of the interface specifications of said at least two desired program components, checking among a plurality of data type transformation rules for a data type transformation rule which provides coincidence between the interface specifications of said at least two desired program components;
 storing the data type transformation rule which provides a coincidence between the data types of the interface specifications of said at least two desired program components in said storage device,
 wherein said mediating program generating step generates said mediating program with both said stored connection mechanism part transformation rule and said stored data type transformation rule.

* * * * *